US008649395B2

(12) United States Patent
Olderdissen

(10) Patent No.: US 8,649,395 B2
(45) Date of Patent: Feb. 11, 2014

(54) PROTOCOL STACK USING SHARED MEMORY

(75) Inventor: Jan RA Olderdissen, Thousand Oaks, CA (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 13/372,325

(22) Filed: Feb. 13, 2012

(65) Prior Publication Data

US 2012/0143979 A1 Jun. 7, 2012

Related U.S. Application Data

(63) Continuation of application No. 11/298,106, filed on Dec. 9, 2005, now Pat. No. 8,121,148, which is a continuation-in-part of application No. 11/089,845, filed on Mar. 24, 2005, now Pat. No. 7,414,975.

(51) Int. Cl.
*H04J 3/16* (2006.01)
*G01R 31/08* (2006.01)

(52) U.S. Cl.
USPC ........... 370/469; 370/236; 370/392; 370/389; 370/474; 709/236; 709/225; 709/250

(58) Field of Classification Search
USPC .......... 370/469, 236, 392, 389, 474; 709/236, 709/225, 250; 714/746; 703/21
See application file for complete search history.

(56) References Cited

U.S. PATENT DOCUMENTS

| | | | |
|---|---|---|---|
| 5,247,517 A | 9/1993 | Ross et al. | |
| 5,343,463 A | 8/1994 | van Tetering et al. | |
| 5,477,531 A | 12/1995 | McKee | |
| 5,568,471 A | 10/1996 | Hershey et al. | |
| 5,572,570 A | 11/1996 | Kuenzig | |
| 5,583,792 A | 12/1996 | Li | |
| 5,600,632 A | 2/1997 | Schulman | |
| 5,657,438 A | 8/1997 | Wygodny | |
| 5,671,351 A | 9/1997 | Wild | |
| 5,761,272 A | 6/1998 | Williams | |
| 5,787,147 A | 7/1998 | Gunderson | |
| 5,787,253 A | 7/1998 | McCreery et al. | |
| 5,805,927 A | 9/1998 | Bowes et al. | |
| 5,822,520 A | 10/1998 | Parker | |
| 5,854,889 A | 12/1998 | Liese | |
| 5,878,032 A | 3/1999 | Mirek et al. | |
| 5,884,037 A * | 3/1999 | Aras et al. ..................... | 709/226 |
| 5,974,237 A | 10/1999 | Shurmer et al. | |
| 5,978,940 A | 11/1999 | Newman | |
| 5,987,633 A | 11/1999 | Newman | |
| 6,028,847 A | 2/2000 | Beanland | |

(Continued)

OTHER PUBLICATIONS

Non-Final Office Action for Application No. 12/146,363 Mail Date Feb. 2, 2010.

(Continued)

*Primary Examiner* — Charles C Jiang
*Assistant Examiner* — Jamal Javaid
(74) *Attorney, Agent, or Firm* — SoCal IP Law Group LLP; Mark A. Goldstein

(57) ABSTRACT

There are disclosed processes and systems relating to optimized network traffic generation and reception. Application programs and a protocol stack may share a memory space. The protocol stack may designate available bandwidth for use by an application program. The application programs may store descriptors from which the protocol stack may form payload data for data units.

9 Claims, 3 Drawing Sheets

(56) References Cited

U.S. PATENT DOCUMENTS

| | | | |
|---|---|---|---|
| 6,067,300 A * | 5/2000 | Baumert et al. | 370/413 |
| 6,088,777 A | 7/2000 | Sorber | |
| 6,108,800 A | 8/2000 | Asawa | |
| 6,122,670 A | 9/2000 | Bennett et al. | |
| 6,148,277 A | 11/2000 | Asava | |
| 6,157,955 A | 12/2000 | Narad et al. | |
| 6,172,989 B1 | 1/2001 | Yanagihara et al. | |
| 6,173,333 B1 | 1/2001 | Jolitz | |
| 6,189,031 B1 | 2/2001 | Badger | |
| 6,233,256 B1 | 5/2001 | Dieterich et al. | |
| 6,279,124 B1 | 8/2001 | Brouwer | |
| 6,321,264 B1 | 11/2001 | Fletcher | |
| 6,345,302 B1 | 2/2002 | Bennett et al. | |
| 6,360,332 B1 | 3/2002 | Weinberg | |
| 6,415,280 B1 | 7/2002 | Farber et al. | |
| 6,446,121 B1 | 9/2002 | Shah | |
| 6,477,483 B1 | 11/2002 | Scarlat | |
| 6,526,259 B1 | 2/2003 | Ho | |
| 6,601,020 B1 | 7/2003 | Myers | |
| 6,601,098 B1 | 7/2003 | Case et al. | |
| 6,678,246 B1 | 1/2004 | Smyth | |
| 6,721,274 B2 | 4/2004 | Hale et al. | |
| 6,789,100 B2 | 9/2004 | Nemirovsky | |
| 6,907,042 B1 | 6/2005 | Oguchi | |
| 6,950,405 B2 | 9/2005 | Van Gerrevink | |
| 7,100,020 B1 * | 8/2006 | Brightman et al. | 712/18 |
| 7,165,112 B2 * | 1/2007 | Battin et al. | 709/230 |
| 7,333,514 B2 | 2/2008 | Anehem et al. | |
| 7,444,432 B2 | 10/2008 | Masputra et al. | |
| 7,451,456 B2 | 11/2008 | Andjelic | |
| 7,587,510 B1 | 9/2009 | Klager et al. | |
| 2001/0047433 A1 * | 11/2001 | Boucher et al. | 709/250 |
| 2002/0037008 A1 | 3/2002 | Tagami | |
| 2002/0080781 A1 | 6/2002 | Gustavsson | |
| 2002/0138226 A1 | 9/2002 | Doane | |
| 2002/0161907 A1 * | 10/2002 | Moon | 709/230 |
| 2002/0172205 A1 | 11/2002 | Tagore-Brage et al. | |
| 2002/0177977 A1 | 11/2002 | Scarlat | |
| 2003/0009544 A1 | 1/2003 | Wach | |
| 2003/0179777 A1 | 9/2003 | Denton et al. | |
| 2003/0231741 A1 | 12/2003 | Rancu et al. | |
| 2004/0254777 A1 * | 12/2004 | Foreman et al. | 703/21 |
| 2006/0067333 A1 * | 3/2006 | Sivakumar et al. | 370/395.52 |

OTHER PUBLICATIONS

Comer, Douglas. "Internetworking with TCP/IP Principles, Protocols and Architectures," Ch.7 (pp. 95-113), Ch.13 (pp. 197-249), Ch.32 (pp. 581-597) Prentice Hall, 4th Ed.

Danzig, Peter et al. "TCPLIB: A Library of TCP Internetwork Traffic Characteristics," BNSDocID XP0992284246, 1991, 8pp.

Zec, Marco et al. "Estimating the Impact of Interrupt Coalescing Delays on Steady State TCP Throughput," 10th Proceedings-SoftCOM 2002 Conf, www.fcsb.hr/SoftCOM/, 6pp.

Zec, Marko "Network stack cloning/virtualization extensions to the FreeBSD kernel," www.tel.fer.hr/zec/vimage/, printed Sep. 8, 2003, 3pp.

Zec, Marko. "Implementing a Clonable Network Stack in the FreeBSD Kernel," 2003 Proceedings of USENIX Annual Tech. Conf., www.usenix.org/events/usenix03/, 14pp.

Zec, Marko. "BSD Network Stack Virtualization," BSDCon Europe, Amsterdam, Nov. 2, 25pp.

* cited by examiner

PROTOCOL STACK USING SHARED MEMORY

RELATED APPLICATION INFORMATION

This patent is a continuation of application Ser. No. 11/298,106 filed Dec. 9, 2005, which is a continuation-in-part of application Ser. No. 11/089,845 filed Mar. 24, 2005, now U.S. Pat. No. 7,414,975 B2, both of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to protocol stacks.

2. Description of the Related Art

In a packet switched network, a message to be sent is divided into packets of fixed or variable length. The packets are then sent individually over the network through multiple switches or nodes and then reassembled at a final destination before being delivered to a target device or end user. To ensure proper transmission and re-assembly of the packets at the receiving end, various control data, such as sequence and verification information, is typically appended to each packet in the form of a packet header. At the receiving end, the packets are then reassembled and the message is passed to the end user in a format compatible with the user's equipment.

Most packet switched networks operate according to a set of established protocols, implemented in a collection of interfaced layers known as a protocol stack. These layers may be defined according to the Open Systems Interconnect (OSI) model, having seven layers (from top to bottom): application, presentation, session, transport, network, data-link and physical. In general practice, though, the application layer is not considered part of the protocol stack, but instead is considered to lie on top of the protocol stack.

All but the physical layer of a protocol stack are typically software, though the network and data-link layer may be firmware and/or hardware. Each layer of the protocol stack typically exists to perform a specific function, such as addressing, routing, framing and physical transmission of packets. When a packet is to be transmitted over a network from a source system to a destination system, the packet will pass in a logically downward direction through layers of the protocol stack on the source system, and in a logically upward direction through corresponding layers of the protocol stack on the destination system. Each layer passes the packet to the adjacent layer, either up or down the protocol stack depending on whether the packet has been received or is being transmitted.

Each layer of the protocol stack in the transmitting process may add a respective header to the packet, which provides information to the corresponding layer in a receiving process. Thus, as a packet passes down through the protocol stack on a transmitting system, the packet may gain an additional header at each layer. At the bottom of the stack, the transmitting process may then frame the packet and physically transmit it over the network toward its destination. When the packet reaches its destination, the packet will then pass up through the protocol stack of the destination system. Each layer of the protocol stack in the destination system may obtain useful information from its associated header and will strip its header from the packet before passing the packet up to the next layer for processing. Application programs typically receives a byte stream from top layer of the protocol stack, not individual packets. The byte stream may consist of data that consists of a partial packet or data that covers more than one packet. This is very convenient for the application but may impair performance.

A variety of standards are known for use in packet switched networks. One of these, the TCP/IP suite, is typically used to manage reliable transmission of packets throughout the Internet and other IP networks. Typical stacks containing TCP/IP consist of five layers: physical, link, network (IP), transport (TCP) and application. These elements correspond to layers 1, 2, 3, 4 and 7 of the OSI model respectively.

The transport layer of TCP/IP corresponds to layer 4 of the OSI model. The transport layer allows source and destination machines to carry on a reliable conversation with each other. Other transport layer implementations commonly used include UDP. With UDP, the application layer is aware of individual packets.

The IP layer in TCP/IP corresponds to the network layer of the OSI model. The IP layer provides addressing information to facilitate independent routing of packets within or between networks and also includes other control layers, such as an Internet Control Message Protocol (ICMP) layer and an Address Resolution Protocol (ARP) layer.

The link layer under TCP/IP corresponds to the data-link layer of the OSI model. The link layer includes network interface card drivers to connect the machine to the physical network, such as an Ethernet network.

In general, the machines that implement the protocol stack in a packet switched network (including, without limitation, source machines, destination machines, packet switches and routers) are computers. Each of these computers includes one or more processors, memories, and input/output ports, and is managed by an operating system.

The computer memory may include a user space and a kernel space. The kernel space is an area of memory which is strictly reserved for running the kernel, device drivers and any kernel extensions. Protocol stacks typically reside in kernel space. Though some portions of the kernel space may be swapped (paged) out to the disk, some portions are typically never swappable. The user space is a memory area used by all applications and this memory can typically be swapped out at any time depending upon the current system requirements. The user space and the kernel space are distinct. An application program usually cannot access the kernel space directly. Application programs may, however, use the kernel to access system resources and hardware through system calls, and are therefore thought of as running above, or on top of, the kernel.

Typically, when an incoming packet enters a computer or other hardware device running a protocol stack, the destination of the packet may be some specific code within the kernel, or it may be an application program. In any event, the packet will typically be processed by multiple layers of the protocol stack and finally arrive at its destination. Similarly, an outgoing packet will typically be processed by multiple layers of the protocol stack before being transmitted onto the network.

When data (e.g., a byte stream) passes between the application layer and the TCP/IP protocol stack's transport layer, the data moves between user space and kernel space. Since user space and kernel space are separate areas of memory, however, the process of moving data includes copying the data to the destination area. This may also include deleting the original, either right away or in a housekeeping operation. Thus, in practice, once an outgoing payload has been processed by the application program in user space, it is copied to kernel space to be processed by the protocol stack. Similarly, once an incoming packet reaches the top of the TCP/IP protocol stack, its payload is copied to user space to be processed by the application.

DETAILED DESCRIPTION OF THE INVENTION

Throughout this description, the embodiments and examples shown should be considered as exemplars, rather than limitations on the apparatus and methods of the present invention.

Description of Systems

As explained above, protocol stacks are commonly used in general purpose computers and other computer devices and systems. Protocol stacks are also used in network testing systems.

Figure 1:
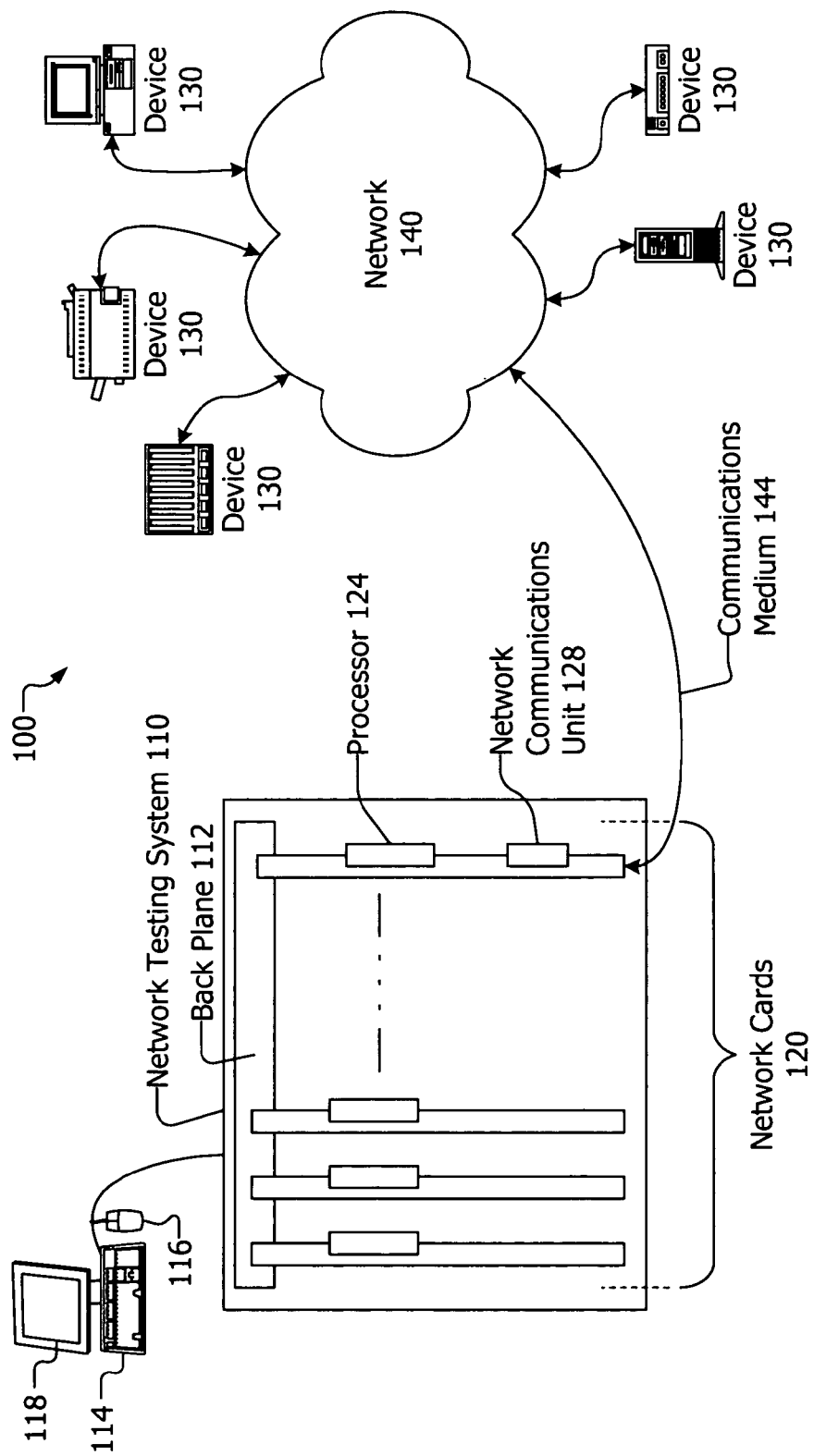
FIG. 1 is a diagram of an environment in which a protocol stack may be implemented.

Referring now to FIG. 1 there is shown a block diagram of an environment 100 in which a protocol stack may be implemented. The environment includes network testing system 110 coupled via a network card 120 to a network 140 over a communications medium 144. The network testing system 110 may include or be one or more of a performance analyzer, a conformance validation system, a network analyzer, a data unit blaster, a network management system, a combination of these, and/or others. The network testing system may be used to evaluate and/or measure characteristics and performance of a communication line or system, including the throughput of network traffic, the number of dropped data units, jitter, and many others. The network testing system may be used to evaluate the performance of servers, networking devices such as, for example, routers, gateways, load sharers, and others, as well as network application programs and other software.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a backplane 112. The network cards 120 may be coupled with the backplane 112. One or more network cards 120 may be included in the network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although only one connection over communications medium 144 is shown, each of the network cards 120 may be connected with network 140 over a communications medium. The communications medium may be, for example, wire lines such as an Ethernet cable, fiber optic cable, and coaxial cable, and may be wireless.

The network testing system 110 and the network cards 120 may support one or more well known higher level communications standards or protocols such as, for example, one or more versions of the User Datagram Protocol (UDP), Transmission Control Protocol (TCP), Real-Time Transport Protocol (RTP), Internet Protocol (IP), Internet Control Message Protocol (ICMP), Internet Group Management Protocol (IGMP), Session Initiation Protocol (SIP), Hypertext Transfer Protocol (HTTP), address resolution protocol (ARP), reverse address resolution protocol (RARP), file transfer protocol (FTP), Simple Mail Transfer Protocol (SMTP); may support one or more well known lower level communications standards or protocols such as, for example, the 10 and/or 40 Gigabit Ethernet standards, the Fibre Channel standards, one or more varieties of the IEEE 802 Ethernet standards, Sonet, CDMA, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®); Bluetooth; may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, data unit engine cards, service cards, smart cards, switch cards, relay access cards, CPU cards, port cards, and others. The network cards 120 may be referred to as blades, particularly when a processor is included on the network card. The network cards 120 may include one or more processors 124 and one or more network communications units 128.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols in hardware. The network communications unit 128 may include a network interface through which the network card 120 may transmit and/or receive communications over the network 140.

The backplane 112 may serve as a bus or communications medium for the network cards 120. The backplane 112 may also provide power to the network cards 120.

The network testing system 110 may have a computer coupled thereto (not shown). The computer may be local to or remote from the network testing system 110. In another embodiment, the network testing system 110 may include a CPU on a card, motherboard or backplane that allows the chassis to also serve as a computer workstation. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or the backplane 112.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the devices 130 in the network 140. The network testing system 110 may be used to test and evaluate the network 140 and/or portions thereof, network capable devices 130, application programs running on network capable devices 130, and/or services provided by network 140 and/or network capable devices 130.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, may be data unit switched or circuit switched, and may be a combination of these. The network 140 may be comprised of a single or numerous nodes providing numerous physical and logical paths for data units to travel.

Communications on the network 140 may take various forms, including frames, cells, datagrams, data units, higher level logical groupings of data, or other units of information, all of which are referred to herein as data units. Those data units that are communicated over a network are referred to herein as network traffic. The network traffic may include data units that represent electronic mail messages, computer files, web pages, graphics, documents, audio and video files, streaming media such as music (audio) and video, telephone (voice) conversations, and others.

The network capable devices 130 may be devices capable of communicating over the network 140 and/or listening to, injecting, delaying, dropping, and/or modifying network traffic on network 140. The network capable devices 130 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and storage area network (SAN) devices; testing equipment such as analyzing devices, network conformance systems, emulation systems, network monitoring devices, and network traffic generators; and networking devices such as routers, relays, firewalls, hubs, switches, bridges, traffic accelerators, and multiplexers. In addition, the network capable devices 130 may include appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

The hardware and firmware components of the network testing system 110 may include various specialized units, circuits, software and interfaces for providing the functionality and features described here. The invention may be embodied in whole or in part in software which operates on a computer and take the form of firmware, an application program, an applet (e.g., a Java applet), a browser plug-in, a COM object, a dynamic linked library (DLL), a script, one or more subroutines, a device driver, or an operating system component or service. The hardware and software of the invention and its functions may be distributed.

Additional and fewer units, modules or other arrangement of software, hardware and data structures may be used to achieve the systems and devices described herein.

To communicate data units on the network 140, the network testing system 110 and other systems and devices may include a protocol stack. The network testing system 110 may have various types of applications programs, such as test applications. These test applications may reside in user space on the top of the protocol stack. Test applications have functions such as performance analysis, conformance validation, network analysis, packet blasting, and network management.

Figure 2:
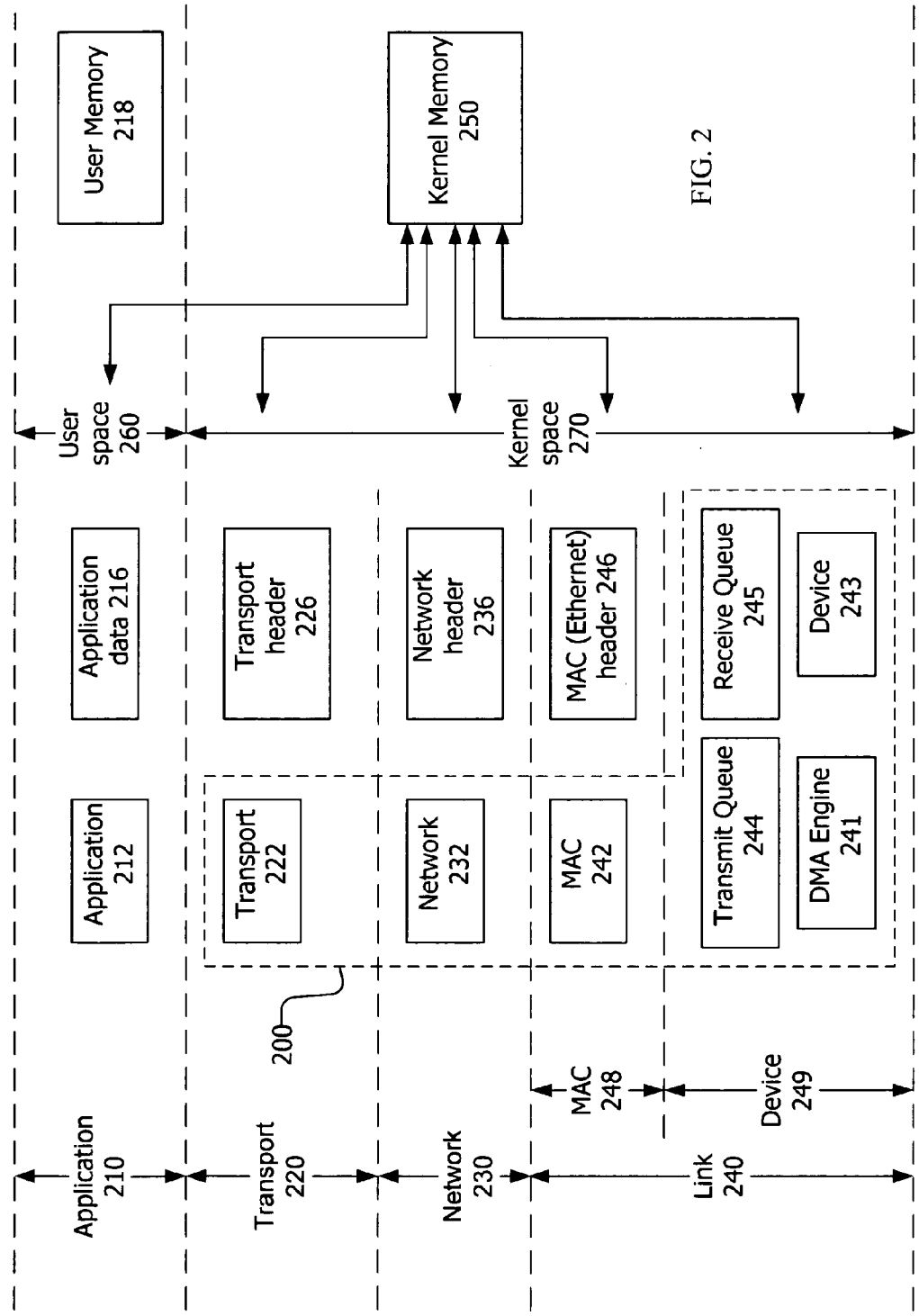
FIG. 2 is a diagram of a logical arrangement in a communications apparatus.

Referring now to FIG. 2 there is shown a diagram of a logical arrangement in a communications apparatus defined by a user space 260 and a kernel space 270. The communications apparatus is logically divided into four layers 210, 220, 230, 240, which in FIG. 2 are demarcated by dashed lines. The application layer 210 is in user space 260. The other layers 220, 230, 240 are in kernel space 270.

Within kernel space 270 there is a protocol stack 200 and a shared memory 250. In FIG. 2, the shared memory 250 is a memory space within kernel memory. The protocol stack 200 may use the shared memory 250 for accessing, managing and operating on data units.

Within the application layer 210, there is an application program 212 and application data 216. It may be noted that the application layer 210 lacks a write buffer as is typical in the prior art. Because the application program 212 accesses the same memory space as the protocol stack 200, a write buffer is not needed. The application data 216 is formed into the payload data of data units.

The protocol stack 200 has the three layers described above: transport 220, network 230 and link 240. The protocol stack 200 runs entirely in kernel space 270. For each layer 220, 230, 240 there may be a corresponding processing unit (software and/or hardware), memory constructs and data constructs. The protocol stack 200 has both transmit and receive capabilities, though this is not required of all protocol stacks.

Within the transport layer 220, there is a transport unit 222 and a transport header 226. The transport unit 222 forms transport headers for transmission and interprets received transport headers. In TCP and UDP, the transport header includes a checksum.

Within the network layer 230, there is a network unit 232 and a network header 236. In a TCP/IP protocol stack, the network protocol is IP. The network unit 232 forms network headers. In IP, the network header 236 includes a checksum.

The link layer 240 may be viewed as having a MAC layer 248 and a device layer 249 as separate layers or sub-layers. Within the link layer 240, there is a media access control (MAC) unit 242, a device 243, a transmit queue 244, a receive queue 245 and a MAC header 246. The MAC unit 242 forms MAC headers for transmission and interprets received MAC headers. The MAC header may be an Ethernet header, though other protocols may be used, such as ATM and Sonet. The device 243 frames and transmits data units, and receives and de-frames data units. The transmit queue 244 may store references to data units to be transmitted and priorities for processing by the device 243. The receive queue 245 may store references to received data units and priorities for processing by the device 243. The device 243 may be or have hardware for assembling data units.

One way to optimize performance of the protocol stack 200 is to minimize data transfers between user memory and kernel memory. Thus, while a typical application program (e.g., a test application) runs only in user space, the application program 212 may be configured or adapted to run in whole or in part kernel space 270. Alternatively, the protocol stack 200 may be configured or adapted to run in user space 260, along with the application program 212. The result is that the application program 212 and the protocol stack 200 can share the memory 250.

By running the application programs and protocol stack in a single memory space, several benefits may be obtained. These benefits include increased speed, lower memory utilization, lower memory requirements, and reduced processing requirements.

One aspect of this improvement lies in communications between the protocol stack 200 and the application program 212. In particular, the protocol stack 200 may be adapted to inform the application program 212 of bandwidth availability. Bandwidth availability may include timing and amount of data that can be sent, so that the application program 212 knows when the bandwidth will be available and how much data the application program can send. The application program 212 may then advantageously utilize this information by timely storing data in the shared memory 250 for the protocol stack 200 to transmit. This process is described further below. Depending on the embodiment, the application program may be permitted to use less than all of the available bandwidth, or it may be required to use all of the available bandwidth, or other constraints may be applied.

At least some of the benefits of running application programs and a protocol stack in a single memory space may be achieved without actually running them both in a single memory space. One option is to have a shared memory space for at least some application programs and for at least some of the layers of the protocol stack. For example, the application programs can be run in user space and the protocol stack in kernel space, but there may be a shared memory space for at least the application, transport and network layers which provides communal access to certain buffers, such as a buffer for data units. Thus, the benefit is achieved because data units do not have to be copied and deleted as they are passed between the application program and the protocol stack, and instead pointers can be passed which point into the communal buffers.

Other software which resides in user space may be configured with or adapted to have the shared-memory capabilities as described herein with respect to application programs. For example, operating system components may reside in user space and may be provided with shared memory access for interoperation with a protocol stack.

The data and/or headers formed by the application program 212 and in the layers 220, 230, 240 of the protocol stack 200 may be in a condensed or otherwise modified form. The condensed form may be an encoded or simplified version. For example, network testing applications will usually send mostly the same data. This data may be, for example, a million zeros, a common header, etc. Although it is possible for the application program 212 to generate all of this data, it may be more efficient to have the data generated within the protocol stack 200, and in particular to have the data generated in a lower, hardware layer.

To accomplish this, the application program 212 may store descriptors of the data in the shared memory space 250 for use by the protocol stack 200. There may be a number of types of descriptors. The payload data for a given data unit may be described by more than one descriptor. The descriptors may designate, for example, raw data, constant data, null data or random data. For raw data, the descriptor may point to a physical buffer in the shared memory space 250 that contains session specific data. For constant data, the descriptor may designate a value or point to a physical buffer that contains constant data. The buffer may be in the shared memory space 250, in user memory, in kernel memory or elsewhere. For null data, the descriptor may describe a segment containing zeros. For random data, the descriptor may describe a segment containing random data. For the constant data and/or null data, the descriptor may include a pre-calculated checksum or partial checksum.

Description of Methods

Figure 3:
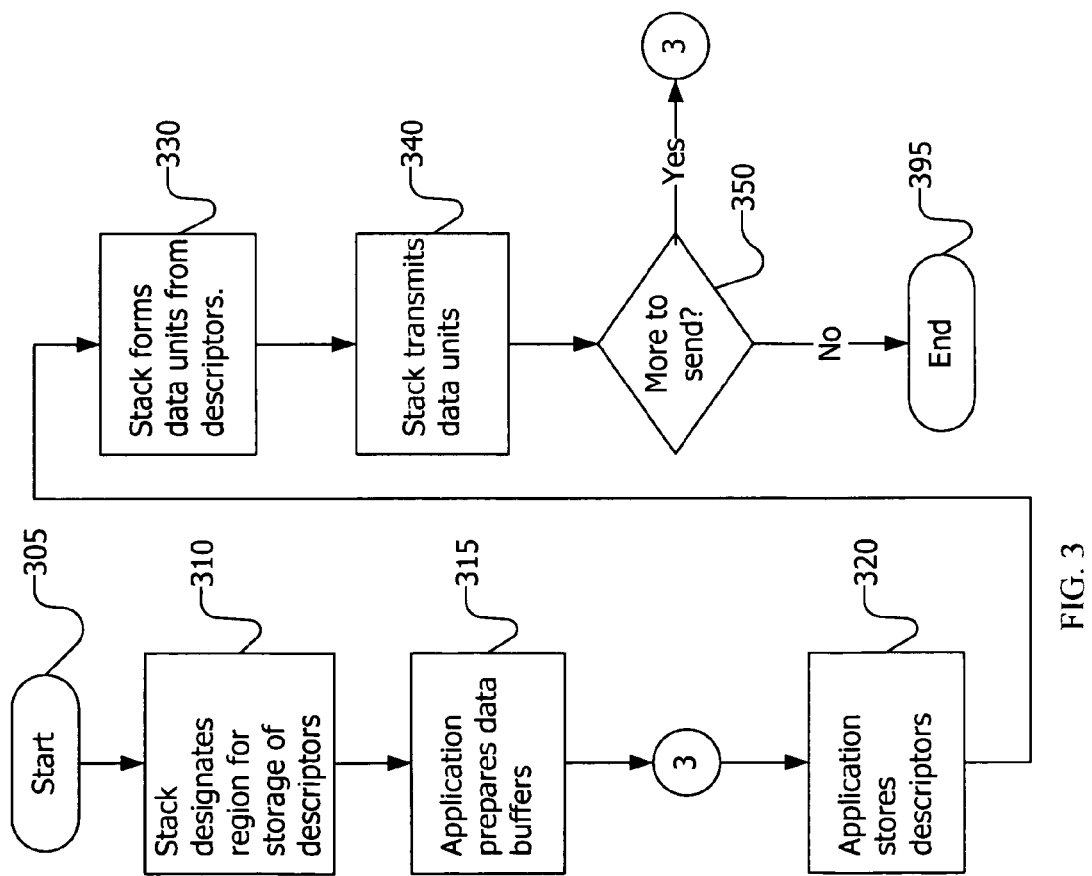
FIG. 3 is a flow chart of a process of operating a protocol stack in a device to transmit data.

Referring now to FIG. 3 there is shown a flow chart of a process of operating a protocol stack to transmit data. FIG. 3 is described with respect to the protocol stack 200 and the application program 212 of FIG. 2 but is compatible with others.

The flow chart has both a start 305 and an end 395, but the process is cyclical in nature. That is, when the application program 212 has data to transmit, the process will continue until all of the data is transmitted (or the process is terminated prematurely).

During operation of the communications apparatus, at some point the protocol stack designates at least one region in kernel memory for storage of descriptors of payload data by the application program (step 310). In conjunction with this designation, the protocol stack may notify the application program about the designation. This may be implemented by the application looking in a predetermined location for the designation. Alternatively, the operating system or another element may notify the application.

On initialization or during operation, the application program may prepare data buffers for use during operation (step 315). In this regard, constant application data may be prepared in advance for multiple sessions. For example, a scaled HTTP client may set up a buffer that contains the HTTP request it is going to send out 10000 times on 10000 TCP sessions.

At some point, the protocol stack may notify the application program of bandwidth available and how to use the available bandwidth. To accomplish this, the protocol stack may provide information to the application program about timing and amount of data. The timing may specify when a transmit window will open, and the size of the window. Alternatively, the timing may specify a deadline for action by the application program.

The process also includes the application program storing descriptors in the designated region in the shared memory (step 320). Some or all of the descriptors may refer to the buffer prepared by the application program (e.g. a constant data buffer).

The protocol stack then forms one or more data units (step 330). Included in this step 330 is the protocol stack forming the payload data from the stored descriptors. Formation of the payload data may be performed by any of the layers of the protocol stack, though this may be limited depending on the implementation.

After a data unit is formed, the protocol stack may then transmit it (step 340). Multiple data units may be transmitted at this point, or they may be formed and transmitted one at a time. Thus, if there is more data to send (step 350), the process will continue at step 320.

As explained above, the descriptors may take many different forms. Depending on the implementation, less than all of the descriptors may be made available, and other forms may be provided. It may be desirable to permit descriptor types to be mixed, so that a given data unit may have payload data described by several descriptors. Use of descriptors may be particularly beneficial in generating streams of test data.

Also, for the task of payload data formation, it may be beneficial to match a descriptor with appropriate stack layers. In general, lower layers operate faster—especially hardware layers. Thus, by assigning tasks to the lowest possible layers in the protocol stack, efficiencies may be obtained. This may also entail dividing certain tasks between layers.

A given descriptor may indicate that the protocol stack can set the payload data to be anything (i.e., "don't care"). In such a case, the protocol stack may set the payload data for the given descriptor to arbitrary data. Alternatively, the protocol stack may set the payload data for the given descriptor to random data. Alternatively, the protocol stack may set the payload data to a value which is efficient to generate. Formation of payload data from the don't care descriptor may be handled in hardware, though a higher layer may be involved in the decision of what the payload data should be.

A given descriptor may indicate that the payload data should be set to a constant value. In such a case, the protocol stack may set the payload data for the given descriptor to the constant value. In this case, too, the hardware is well suited to forming the payload data.

A given descriptor may indicate that the payload data should be set to constant application data pointed to by a buffer. In such a case, the protocol stack may set the payload data for the given descriptor to the constant application data pointed to by the buffer. After the constant application data has been obtained from the buffer, the hardware is well suited to forming the payload data.

Further optimization may be realized using macros of descriptors. For example, a macro may dictate that the protocol stack send:
  a fixed number of don't care bytes;
  a specified amount of data from a specified buffer;
  combinations of descriptors, such as a specified constant string, then a specified number of don't care bytes, then a specified number of null bytes.

The protocol stack may use these macros to form a sequence of data units over time. This reduces interaction between the application program and the protocol stack. Similarly, on the receive side (discussed further below), the receive engine can be instructed to receive a specified number of don't care bytes. The receive engine would then consume data units until those macro instructions are met.

While this description has been with respect to payload data, the same concepts may be applied to efficiently generate headers as well. For example, in stateless protocols the header can also be considered a constant. In largely stateless protocols such as UDP over IP, the header can be considered constant with exceptions. In UDP the ID field in the IP header needs to be updated. Here, the data before and after the ID field can be treated as constants.

Some or all of the features described herein may be combined with a modified protocol stack, such as the one described in application Ser. No. 11/089,845.

Transmission Examples

In a test scenario where payload content is irrelevant (for example when running a throughput test over a layer 2 or layer 3 device), it is not necessary to copy payload data at any point. Instead, arbitrary payload data may be generated by the transmission hardware on the fly and ignored on the receive side.

In this scenario, the application program instructs the protocol stack to send data on an existing connection. The protocol stack then creates a data unit. Note that the "don't care" descriptor does not actually contain any payload data. It merely describes to the protocol stack (e.g., the DMA engine) the length of that segment and that the application program does not care about the actual data.

The data unit is then transmitted by the protocol stack (e.g., the DMA engine). This involves copying the header from main memory; synthesizing the payload data in the "don't care" section in the way most efficient for the transmission engine (for example, all zeroes); calculating the TCP checksum; calculating and appending the Ethernet CRC; and sending the packet.

Using "don't care" segments instead of copying data from user space to the kernel memory for each data unit has the following advantages:
  Two copy operations are eliminated for each transmit and receive.
  Memory is saved as the payloads do not need to be separately stored for each packet.
  The payload does not have to be flushed from cache.
  The payload data is not dragged through the CPU's cache.

Because payloads can make up a large percentage of a packet (96% for standard Ethernet frames), the leverage gained from not running that data through main memory and the CPU is tremendous. Also, by carefully choosing the payload data (for example, all zeroes), the transmission engine can trivially compute the TCP and Ethernet checksums ahead of time (before generating the data) for those segments.

In a variation of this scenario, the application program indicates that random data should be sent. As above, the transmission engine is responsible for turning the descriptor into a stream of bytes containing random values.

Using a constant value instead of copying this data from user space to the kernel memory for each packet has the following advantages:
  Two copy operations are eliminated.
  Memory is saved as the payloads do not need to be separately stored for each packet.
  The payload does not have to be flushed from cache.
  The payload data is not dragged through the CPU's cache.
  However, checksums probably cannot be trivially computed ahead of time in this case.

In another variation, the application program indicates the constant value that each byte in the payload should have. As above, the transmission engine is responsible for turning the descriptor into a stream of bytes containing the indicated constant value.

Using constant value instead of copying this data from user space to the kernel memory for each packet has the following advantages:
  Two copy operations are eliminated.
  Memory is saved as the payloads do not need to be stored at all.
  The payload does not have to be flushed from cache.
  The payload data is not dragged through the CPU's cache.
  The impact of constant blocks on checksums can be trivially computed.

In another variation, the application program points to a shared buffer that contains constant application data. The buffer is considered "shared" because it is shared by other packets. In this variation, the transmission engine reads the payload from memory as directed by the constant data segment descriptor.

Using constant data pointers to shared data instead of copying this data from user space to the kernel memory for each packet has the following advantages:
  A copy operation is eliminated.
  Memory is saved as the payloads do not need to be separately stored for each packet.
  The memory the payload points to does not have to be explicitly flushed from cache for each individual packet. This is done ahead of time, which obviates this expensive operation on a packet by packet basis.
  The payload data is not dragged through the CPU's cache.

As a further optimization, the impact of the constant data on checksums can be computed ahead of time.

Constant buffers are very useful when simulating large numbers of sessions that transfer identical data. For example, this might arise from ten MPEG encoded, time shifted video channels with the same program.

Receiving Data Units

The communications apparatus may process received data units in a manner similar to that for transmission, but reversed. That is, data units are received at the lowest layer of the protocol stack and passed up, eventually to the application program.

The protocol stack may store the payload data directly in the shared memory, and the application program may directly retrieve the payload data from the shared memory. This allows the application program to examine the header only and decline to look at the rest of the data unit. Since the data unit is in shared memory, the payload data does not need to be loaded from memory or be cached (which improves cache efficiency).

Another option is to pre-program the receive engine to summarize segments of received payload. As a given data unit is received, the receive engine may recognize that the connection this data unit is destined for is configured to summarize payload or a section of the payload (e.g., using a CAM, a hash or other pattern matching system). This allows the receive engine to copy only the segments of the data unit not summarized in addition to the summary to memory.

Depending on implementation and configuration, the summarization can be:

Just the number of bytes received.

The number of bytes received in addition to a Boolean indicating whether the data matched a certain pattern (a block of zeroes for example).

The number of the same bytes received and their value.

A variation on this is for the receive engine to collapse the received data unit based on detecting certain patterns autonomously. For example, the receive engine could detect continuous blocks of the same byte value and collapse them into a summary. This obviates the need for the application program to pre-program the receive engine to collapse segments of payload.

CLOSING COMMENTS

The foregoing is merely illustrative and not limiting, having been presented by way of example only. Although exemplary embodiments of the invention have been shown and described, it will be apparent to those having ordinary skill in the art that changes, modifications, and/or alterations may be made, none of which depart from the spirit of the present invention. All such changes, modifications and alterations should therefore be seen as within the scope of the present invention.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A computing device comprising
    a processor, user memory, kernel memory and a network communications unit
    an application program disposed in user space in the user memory
    a communications protocol stack configured to interact with the application program,
    wherein the communications protocol stack is disposed in kernel space in the kernel memory, the communications protocol stack comprising
        a plurality of interfaced layers in which data units are received at the highest layer and logically passed down to and processed by succeeding lower layers
        wherein the communications protocol stack is adapted to inform the application program of bandwidth availability on the computing device, the bandwidth availability including timing information and an amount of data that can be sent, wherein the timing information comprises at least one of when a transmit window will open paired with a size of the transmit window and a deadline for action
        wherein the communications protocol stack is further adapted to designate at least one region in a shared memory for storage of descriptors of payload data by the application program and to form data units from the descriptors of payload data obtained from the shared memory
        wherein the communications protocol stack is adapted to recognize the descriptors indicative that the protocol stack should set the payload data to be one selected from the group including anything, a constant value or constant application data.

2. The computing device of claim 1 wherein the constant application data is pointed to by a buffer.

3. The computing device of claim 1, wherein the computing device is a communications apparatus.

4. The computing device of claim 1 wherein the plurality of interfaced layers include at least two of, from highest to lowest, a session layer, a transport layer, a network layer and a data-link layer.

5. The computing device of claim 4 wherein the transport layer is the transmission control protocol of a TCP/IP protocol and the network layer is the Internet Protocol of the TCP/IP protocol.

6. A process for transmitting data using a communications protocol stack on a computing device, the communications protocol stack comprising a plurality of interfaced layers, wherein the communications protocol stack is disposed in kernel space on the computing device, the communications protocol stack for interacting with an application program which is disposed in user space on the computing device, the process comprising
    informing the application program of bandwidth availability on the computing device, the bandwidth availability including timing information and an amount of data that can be sent by the computing device, wherein the timing information comprises at least one of a deadline for action and when a transmit window will open paired with a size of the transmit window
    designating at least one region in a shared memory for storage of descriptors of payload data by the application program
    forming data units from the descriptors of payload data placed in the shared memory by the application program, the forming including
        obtaining the descriptors of payload data from the shared memory
        recognizing the descriptors of payload data
        based on the recognized descriptors performing one of the following actions
            setting the payload data to be anything
            setting the payload data to be a constant value
            setting the payload data to be constant application data.

7. The process of claim 6 wherein the constant application data is pointed to by a buffer.

8. The process of claim 6 wherein the plurality of interfaced layers include at least two of, from highest to lowest, a session layer, a transport layer, a network layer and a data-link layer.

9. The process of claim 8 wherein the transport layer is the transmission control protocol of a TCP/IP protocol and the network layer is the Internet Protocol of the TCP/IP protocol.

* * * * *